3,029,783
ANIMAL LITTER COMPOSITION

Edgar W. Sawyer, Jr., Metuchen, N.J., and Wright W. Gary, Vevey, Switzerland, assignors to Minerals & Chemicals Philipp Corporation, a corporation of Maryland
No Drawing. Filed Apr. 14, 1958, Ser. No. 728,088
3 Claims. (Cl. 119—1)

This invention relates to an improved inorganic litter for small animals and poultry.

The housings of small animals, particularly when several such animals are confined in a group, presents many well-known difficulties relative to the disposal of animal droppings and the like. This disposal is ordinarily accomplished by bedding the animals in a litter capable of sorbing the liquid component of such droppings to a sufficient degree that the litter is useful for at least several days before noxious odors or physical breakdown of the litter requires its removal. A desirable litter is one that not only has high-water sorptivity but also possesses: low degree of dusting; adequate crush strength so that the bodily movements of the animal do not pulverize it; high sorptivity for odors, particularly ammoniacal odors; self-sanitizing properties so that the litter is not a breeding ground for infection; non-toxic character, since many animals are prone to eat the litter and the droppings thereon; and ability to retain physical form in the presence of large quantities of moisture.

The use of granulated fuller's earth, diatomaceous earth and the like, heat treated to increase the hardness of the material and to destroy the colloidal properties thereof has been suggested for use in litters in the prior art. Such materials, although possessing excellent sorptivity for liquids and adequate hardness, fail principally in their ability to occlude ammoniacal odors. Furthermore, the fuller's earth per se possesses no self-sanitizing properties and droppings from one diseased animal may be transferred to other animals caged together with the diseased animal by means of the organisms resident in the litter.

Accordingly, it is a principal object of the invention to provide an improved inorganic granular litter which inherently possesses substantial deodorizing capacity.

It is another object of the invention to provide an improved inorganic litter possessive of deodorizing and self-sanitizing properties.

Other objects will be apparent from a reading of a description of the invention and examples thereof which follows.

Briefly, the instant invention is a result of our finding that a valuable component of a litter is provided when the aluminum of a mineral comprising an aluminosilicate or alumina is reacted with sulfuric or hydrochloric acid to form in situ inter se aluminum sulfate or chloride, respectivly. These salts, in intimate association with the residue of the aluminiferous base materials, are capable of neutralizing basic odors originating in certain nitrogen compounds present in animal droppings or which are formed therefrom through decomposition. When the residue of the aluminiferous base material with associated in situ formed aluminum salt is admixed with a granular sorptive carrier of a character hereinafter specified, a heterogeneous litter composition is provided which is possessive of high ammonia and water sorptivity. Litters provided by our invention are inexpensive, hard, relatively dust free, and, preferably, self-sanitizing and deodorizing. In a preferred embodiment of our invention, the heterogeneous litter composition is rendered self-sanitizing by inclusion of a small quantity of a germicidal compound.

In accordance with our invention we formulate various litters of compositions suitable for handling the droppings of a variety of small animals by appropriate choice of aluminum salt concentration in the aluminiferous residue base and by employment of suitable ratio of said base to sorptive carrier. The aluminiferous base and sorptive carrier are both suitably chosen to possess high resistance to spalling or loss of physical form in the presence of large amounts of moisture and have crushing strength sufficiently great that the bodily movements of animals housed thereon do not produce dusts which have a deleterious effect on the animals.

The heterogeneous litter of our invention is provided in essentially granular form. The litter should preferably include at least some relatively fine granules to improve the ability of the litter in use to sorb moisture from the droppings through capillary transfer. However, the presence of powdered material, that is, material passable through a 325-mesh, introduces undesirable dust into the litter. Particularly desirable composited litters have granules within the range of from about 12/42, 12/30, 12/20 or substantially all 12-mesh material.

More specifically, in accordance with our invention, we provide an ammonia sorptive component of our litter by treating an aluminiferous inorganic material, preferably a mineral, with hydrochloric or sulfuric acid under conditions such as to effect substantial reaction between the aluminum of said aluminiferous material and the mineral acid, and, without substantially eliminating the salt thus formed, removing unreacted acid, thereby to produce in situ an aluminium salt intimately associated with the residue of an aluminiferous material. Aluminum sulfate and aluminum chloride have the ability to form complexes with ammonia and certain nitrogenous bases, which are offensive constituents produced during the decay of animal excrements. Ammonia and/or nitrogenous bases tied up in an aluminous complex are in relatively non-volatile form and cannot contribute a noxious odor to the environment. Although mineral acid salts of magnesium and iron form complexes with ammonia derivatives, said salts do not have the odor removing capacity of the corresponding aluminum salts which are present in the litter compositions of our invention.

Suitable aluminiferous minerals for acid reaction have an alumina content, calculated as $Al_2O_3$, of at least about 15%, based on the V.F. weight of the mineral, and more preferably from 25 to 50% by V.F. weight, V.F. weight referring to volatile-free weight which is the weight of the mineral after heating to essentially constant weight at about 1800° F. The alumina in said aluminiferous material must be in a form such that it is reactive with the acid since the simple sorption of the mineral acid by the aluminiferous material will not produce a satisfactory base. Although the presence of free mineral acid entrained in the mineral mass would inherently possess the ability to pick up ammonia and/or lower amines resident in or generated by animal droppings, nevertheless the presence of free acid is deleterious to the animals confined in the cage including the litter and is to be avoided. Preferred species of aluminiferous minerals are kaolin clay and bauxite, both usually having alumina contents well above 35%, V.F. basis, said alumina being in a form which, under suitable conditions, is reactive with mineral acid. Bauxite consists essentially of alumina which may be in the form of gibbsite (alpha-alumina) or diaspore (gamma-alumina) depending on its source, and ordinarily includes minor amounts of impurities which are principally silica and iron. It will be understood that we may use the synthetic counterparts of the aluminiferous minerals herein set forth. Kaolinitic clays are hydrous alumino-silicates in which the chief mineral constituent is kaolinite, nacrite, dickite, halloysite or anauxite. These aluminosilicates usually have the general formula $Al_2O_3 \cdot 2SiO_2 \cdot 2H_2O$ The weight ratio of $SiO_2$ to $Al_2O_3$ indicated by this formula is 1.17:1 and kaolin clays have $SiO_2$ to $Al_2O_3$ weight ratios in the range of 1.0–1.5:1. The weight percent of alumina in kaolinitic clays is usually about 46%, V.F. basis. Other aluminosilicates which we may acid react to provide the granular ammonia-sorptive component of our litter include illite, chlorite, pyrophillite, bidellite, high alumina content shales, vermiculite, hydromicas, and high-alumina low-iron montmorillonite. The solubility of the alumina in these aluminosilicates and aluminas varies, inter alia, with the acid strength, acid dosage, temperature at which acid-mineral contact is effected and length of treatment. In general, magnesia, calcium and iron are more reactive than alumina in these minerals and, therefore, when the aluminosilicate is rich in magnesia, calcium and/or iron care should be taken that acid treatment is sufficient to assure reaction of at least a portion of the aluminum, this being most readily judged by the improved ammonia sorptivity of the reacted product. The degree of crystallinity of a mineral specie is known to influence the solubility of the aluminum content in mineral acid. Futrhermore, calcination of clay minerals changes their solubility characteristics, this being described in Grim, R. E., Clay Mineralogy, 296–299 (1953).

Many methods for reacting the alumina of aluminosilicates, particularly kaolinitic clays and montmorillonite clays, are well-known and are described in textbooks such as Grim, hereinabove referred to. Acid treatment of kaolinitic clays is extensively described in numerous patents, particularly those concerned with the separation of alumina from the silica of the clay. Such processes are described in U.S. Patent No. 2,044,341 to Wollner, U.S. Patent No. 2,476,979 to Hoeman, U.S. Patent No. 2,729,570 to Nichols. The various processes for reacting the alumina of clay with a mineral acid which are detailed in these patents are applicable to the preparation from clays of the ammonia-sorptive component of animal litters of our invention with the exception that acid reacted clay component of our invention is not prepared by a process which entails appreciable removal of the aluminum sulfate reaction product by leaching or other processing since the presence of aluminum sulfate in the composition is an essential feature of our invention, as mentioned hereabove. When sulfuric acid is employed in the preparation of the acid-reacted component of the litter, the resultant acid-reacted product is preferably calcined at a temperature level sufficient to eliminate unreacted acid yet insufficient to effect substantial decomposition of the aluminum sulfate salt into the corresponding oxide since the aluminum must be present in the form of the salt thereof in compositions of our invention. Furthermore, we do not need to effect complete reaction between the alumina of the clay and the acid since small concentrations of aluminum sulfate or chloride are effective in neutralizing animal odors. Suitable conditions for reacting montmorillonite clays with mineral acid are well-known to those skilled in the catalyst art. Although disclosures of suitable acid dosages and reaction conditions may be found in the catalyst art for reacting montmorillonite minerals, nevertheless these prior art practices must be modified to exclude extensive leaching or otherwise eliminating substantially the in situ formed acid salt from the aluminiferous mineral.

Pursuant to our invention, kaolin clay is treated and reacted with sulfuric acid to provide the ammonia-sorptive base component of our litter by reacting raw clay with a 60 to 125% dosage of concentrated sulfuric acid, such as the commercially available 66° Bé. (about 93% $H_2SO_4$) grade, extruding the mixture to form granules, aging the granules to complete the reaction between the alumina of the clay and the acid, and, if necessary calcining the aged pellets at a temperature sufficient to eliminate free acid yet inadequate to decompose substantially the in situ formed aluminum sulfate. This product is then admixed with a suitable water-sorptive carrier.

We may also prepare our ammonia-sorptive base material by treating conventional activated bauxite or equivalent synthetic alumina with a dilute solution of mineral acid. It is preferred that the alumina be thermally activated in accordance with the known methods prior to contact with acid. Such an activation process is fully described in an article by LaLande, McCarter, and Sanborn entitled "Bauxite as a Drying Adsorbent" published in Industrial and Engineering Chemistry, Volume 36, page 99 through 109, February 1944. Although the unactivated alumina may be treated, the benefits realized by the use of the highly sorptive activated material will not be realized. However when the unactivated mineral is extensively reacted with acid and the resultant modified mineral is admixed in very small quantity, such as 10% or less, with a sorptive carrier the advantages inherent in employing activated alumina may be somewhat minimized.

The alumina is suitably reacted with a dilute solution of sulfuric or hydrochloric acid. The concentration of the solution may range from 4 to 20%, with 5 to 12% being preferred. This reaction may suitably be carried out simply by adding the alumina to the solution preferably at room temperature, although higher or lower temperatures may be used, as desired. Preferably, after the alumina is completely wet with the acid solution, it is removed and the excess solution permitted to drain off. The necessary reaction between the alumina and the acid takes place rather rapidly, for example, in about 5 to 30 minutes or so depending, to some extent, on the concentration of the acid solution and the reaction temperature. After reaction of the alumina and the acid, the alumina without being washed is heated at an elevated temperature, such as between 600° F., and preferably 750° F., for a time sufficient to eliminate any unreacted acid. Heating for about ½ hour usually is sufficient, although longer or shorter periods are satisfactory provided that substantially all of the free acid is eliminated. As above-mentioned, when the activated alumina is completely wet with the acid solution, preferably, it is removed from the solution, drained, and allowed to react with the acid with which it is wetted. The characteristics of alumina are such tthat this amount will be approximately 40 to 55% by weight based on the alumina.

While we have described one method of reacting the alumina and acid, it is to be understood that the reaction may be carried out in other suitable ways, such as by slurrying the alumina in acid solution having a concentration of from 4 to 20% and permitting the reaction to proceed for a sufficient time. Since the extent to which the acid treatment is carried out depends, among other things, on the type and concentration of the acid solution and also the type of alumina, it is not possible to set forth herein the optimum treating time in any particular case. The acid treated alumina must not be washed out extensively prior to being heated to eliminate free acid since such washing nullifies the effect of acid treatment.

The free acid analysis of our litter should be low, preferably less than 0.5%. Accordingly, unreacted acid must be eliminated from the reacted aluminiferous base. This is preferably accomplished by thermal treatment. When sulfuric acid is used to modify the aluminiferous material, unreacted acid may be eliminated from the reacted materials by calcination, typically within the range of from 750 to 1400° F. and preferably within the range of from 850 to 1000° F. Below about 850° F. evolution of unreacted acid is incomplete. Above about 1000° F. some decomposition of the aluminum sulfate takes place. When hydrochloric acid is used unreacted acid is eliminated by heating the acid reacted mineral at an elevated temperature below a temperature at which volatilization of hydrochloric acid takes place.

Our invention, in its broadest aspect is not restricted to any specific aluminum salt concentration in the ultimate composited mass since the optimum concentration varies considerably with the characteristics of the animal bedded thereon, and will also depend to a large extent whether the animal is bedded directly on the litter or whether a screen or other network is interposed between the animal and tthe litter so that the animal never has bodily contact with the litter. In general, it may be said that aluminum salt concentrations in the composited heterogeneous litter should lie within the range of from about 0.5 to 15% and preferably from about 1 to 10% when the animal is bedded directly on the litter and has bodily contact therewith. Higher salt concentrations are feasible when the animal is not housed directly on the litter in which case the astringency of the aluminum salt in high concentration is not a factor in delimiting the concentration.

We have observed that the water sorptivity of acid reacted stock is sacrificed with increase of acid dosage and this factor must be balanced against the higher ammonia absorption obtained with increasing dosage. For this reason in the preparation of our novel animal litter we admix the acid reacted aluminosilicate or alumina with a granular sorptive carrier thereby to increase the water sorptivity of the admixture, to prevent the aluminous salts from deliquescing and to dilute the concentration of the aluminous salt to a suitable level at which the astringency will not be deleterious to animals bedded thereon. We find that the sorptive carrier should be essentially neutral or slightly acid in character, carriers having a pH in excess of about 8.5 when slurried in water not being suitable. Particularly useful carriers are aluminosilicate minerals which may include magnesium and/or calcium and other metallic constituents, such minerals being activated when necessary, by thermal treatment in accordance with well-known methods to eliminate their gel-forming characteristics in water, to improve their crush resistance and, in some instances, to improve their sorptivity. Species of suitable aluminosilicates include activated attapulgus earth and certain montmorillonite clays. Attapulgus fullers earh (attapulgite clay) which is mined principally in Florida and Georgia, is a particularly valuable carrier when heat activated to eliminate its gel-forming properties and improve its crush strength, this being suitably accomplished by heating the earth at a temperature between about 750 to 900° F. to reduce the volatile matter (or V.M.) to 7% or less. The term volatile matter, as used herein, refers to the weight percentage of a mineral eliminated after heating the mineral to essentially constant weight at about 1800° F. Other carriers consist essentially of alumina or silica in hard, sorptive form, the alumina being typified by bauxites of gibbsitic or diasporic nature. An inexpensive highly satisfactory form of silica is diatomaceous earth. As in the case of the mineral aluminosilicates, we find that the mineral forms of alumina and silica are advantageously heat activated to improve their physical properties with respect to performance in animal litter compositions of our invention. It will be understood the synthetic forms of alumina, silica or aluminosilicates may be used in lieu of or in conjunction with their naturally-occurring counterparts. Likewise, it is fully within the compass of our invention to use a combination of sorptive materials in providing the carrier. This may be accomplished either by granulating a mixture of minerals to provide granules of heterogeneous composition or by commingling species of granules of homogeneous composition.

The aluminiferous minerals are preferably acid treated subsequent to granulation since the presence of the acid salt on the granule surface, rather than in the granule interior, is responsible for the efficacy of the acid reacted mineral. However, when a mineral, such as kaolinite has a low reactivity towards the mineral acid, reaction may be facilitated by contacting finely-divided mineral with acid and thereafter forming granules by extrusion or the like. When the mineral is such that granules thereof spall in the presence of acid, then acid contact should be a step antecedent to granulation.

As has been mentioned hereinabove, we preferably include a germicide in our litter for the purpose of killing or inhibiting micro-organisms which decompose certain organic nitrogen compounds with resultant generation of odiferous ammonial matter but also those organism of a pathogenic nature. Particularly useful germicides include those commonly classified as "onium nitrogen compounds," the term referring to a group of organic compounds which are isologs of ammonium salts containing nitrogen in its pentavalent state. Species include quaternary ammonium compounds of trialkyl benzyl, tetraalkyl benzyl, trialkyl alkyl benzyl, and alkyl imidazoline salts, salts of pyridine, naphthylamine, salts of the alkyl, dialkyl, trialkyl, and heterocyclic amines. Other germicides such as phenyl mercuric salts and certain phenolic compounds may be used if the resultant composition does not exhibit excessive mammalian toxicity. From about 0.025 to about 3.0 parts by weight of germicide is added to 100 parts by weight of composited litter. The germicide, preferably in the form of a dilute solution, may be distributed on either the acid-reacted aluminiferous base, the sorptive mineral carrier or the composited litter by any means well-known in the art which insures adequate distribution of the germicide on the solid. The solution spraying of a water-diluted germicide is a satisfactory technique. It should be noted that when the germicide is applied to the acid-reacted aluminiferous base the said base should be cooled to preclude the possibility of degradation of the germicide.

The examples of our invention which follow are given merely to illustrate certain embodiments of our invention and are not to be construed as limiting the invention thereto.

*Example I*

A composition of my invention is prepared by admixing granules of sulfuric acid-reacted kaolin clay with granules of activated attapulgite in the proportion of 25 parts by weight of acid-reacted kaolin to 75 parts by weight of activated attapulgite. The admixture is then treated with a solution of Hyamine 1622 (p-di-isobutyl-phenoxy-ethoxy-ethyl-dimethyl-benzyl ammonium chloride), produced by Rohm & Haas, Inc., the solution being sprayed thereon in amount sufficient to deposit 0.3% of the pure Hyamine 1622, based on the weight of the composition.

In the preparation of the ammonia-sorptive base material, water-washed Georgia kaolin clay of about 14% V.M. is mixed with sulfuric acid of about 93.2% concentration, the amount of acid used being equivalent to a dosage of about 80%. The starting clay has the following approximate analysis (V.F. basis).

| | Percent |
|---|---|
| $SiO_2$ | 52.10 |
| $Al_2O_3$ | 45.34 |
| $Fe_2O_3$ | 0.34 |
| $TiO_2$ | 2.22 |

The clay and acid are mixed by pugging and the mixture is continuously formed into pellets about 3/16-inch in diameter and about 3/16-inch long by feeding the pugged mixture to an auger mill which extrudes the mixture through a die plate. The extruded mixture is cut into granules of the size above noted. The granules are aged in white mineral oil maintained at 315° F. by being conveyed through the oil in a screen conveyor, the retention time in the hot oil being about three hours. The aged granules are discharged from the screen conveyor and separated from the oil by screening, and calcined at 850° F. to burn off residual oil and to eliminate substantially free acid. The cooled granules of acid-reacted kaolin clay are admixed with 12/42-mesh granules of attapulgus fullers earth which have been activated at about 700 to 800° F. for a sufficient time to reduce the volatile matter to about 7%. The germicide is thereafter sprayed on the admixed granules.

*Example II*

Another litter of my invention is prepared as follows. A 50 gram sample of granular Surinam bauxite, activated at 750° F. for ½ hour is treated with 45 cc. of an 18% hydrochloric acid solution for approximately 12 hours, drained and calcined for ½ hour at 750° F. to eliminate unreacted acid. The bauxite thus treated is admixed with 150 grams of bauxite granules, activated at 750° F. for ½ hour.

We claim:

1. An animal litter composition comprising in granular form a mixture of kaolin clay which has been reacted with a 60% to 125% dosage of a concentrated mineral acid selected from the group consisting of sulfuric acid and hydrochloric acid, and, without washing water-soluble constituents therefrom, has been heated to remove substantially all free acid therefrom without affecting aluminum salt reaction products, and at least one sorptive mineral in amount such that the aluminum salt concentration of the mixture is from about 0.5% to 15.0%, said sorptive mineral being selected from the group consisting of water-sorptive noncolloidal clay, diatomaceous earth and bauxite.

2. An animal litter composition comprising a granular mixture of kaolin clay which had been reacted with a 60% to 125% dosage of concentrated sulfuric acid, and, without washing water-soluble constituents therefrom, has been heated to remove substantially all free acid therefrom without decomposing sulfate reaction products, and at least one sorptive mineral in amount such that the aluminum salt concentration of the mixture is from about 0.5% to 15.0%, said sorptive mineral being selected from the group consisting of water-sorptive noncolloidal clay, diatomaceous earth and bauxite.

3. An animal litter composition comprising a mixture of about 25 parts by weight of granules of kaolin clay which has been reacted with a 60% to 125% dosage of concentrated sulfuric acid, and, without washing water-soluble constituents therefrom, has been heated to remove substantially all free acid therefrom without decomposing sulfate reaction products, and about 75 parts by weight of granules of calcined attapulgite clay.

References Cited in the file of this patent

UNITED STATES PATENTS

| | | |
|---|---|---|
| 1,800,687 | Henderson | Apr. 14, 1931 |
| 2,649,759 | Gibbs | Aug. 25, 1953 |
| 2,895,873 | Sawyer et al. | July 21, 1959 |